(12) United States Patent
Morgan et al.

(10) Patent No.: US 6,622,278 B1
(45) Date of Patent: Sep. 16, 2003

(54) METHOD AND APPARATUS FOR FORMATTING A MESSAGE IN A WIRELESS COMMUNICATION SYSTEM

(75) Inventors: William Morgan, Elgin, IL (US); Michael J. Kinnavy, Chicago, IL (US); Michael Mao Wang, Carpentersville, IL (US)

(73) Assignee: Motorola, Inc., Schaumburg, IL (US)

( * ) Notice: Subject to any disclaimer, the term of this patent is extended or adjusted under 35 U.S.C. 154(b) by 478 days.

(21) Appl. No.: 09/633,966

(22) Filed: Aug. 8, 2000

(51) Int. Cl.⁷ .............................................. H03M 13/00
(52) U.S. Cl. ........................................ 714/758; 714/776
(58) Field of Search .................................. 714/758, 746, 714/796, 795

(56) References Cited

U.S. PATENT DOCUMENTS

| | | | |
|---|---|---|---|
| 4,032,886 A | | 6/1977 | En et al. |
| 5,563,895 A | * | 10/1996 | Malkamaki et al. ........ 714/748 |
| 5,844,918 A | * | 12/1998 | Kato .......................... 714/751 |
| 6,173,431 B1 | * | 1/2001 | Rittle .......................... 714/778 |

* cited by examiner

*Primary Examiner*—Albert Decady
*Assistant Examiner*—Mujtaba Chaudry
(74) *Attorney, Agent, or Firm*—Steven A. May

(57) ABSTRACT

A wireless communication system includes a transmitting device having a formatting circuit. The formatting circuit for constructing a frame, the frame including frame header, frame CRC, and a message slot. The message slot having a predetermined length for carrying signaling message, the signaling message including a message header having the message length, a message body and a message CRC, the message body and message CRC being repeated to fill the message slot, a partial copy being copied into the message slot if the slot is not full and a full copy of the message body and message CRC will not fit. A receiving device includes a format circuit coupled to the decoder for outputting a message from the decoded frame, the format circuit to check the frame CRC to determine if the frame CRC is good, to check the message CRC to determine if the message CRC is good, and to reconstruct the message from the full and partial copies of the message if the message CRC is not good.

18 Claims, 5 Drawing Sheets

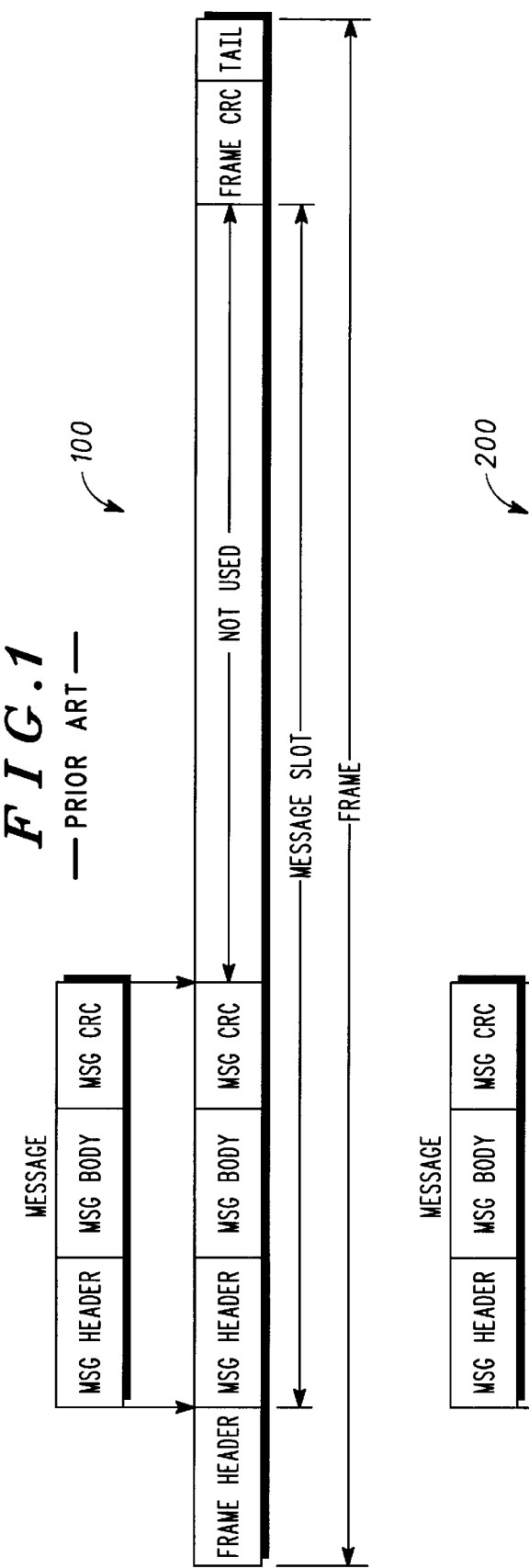
FIG. 1 —PRIOR ART—
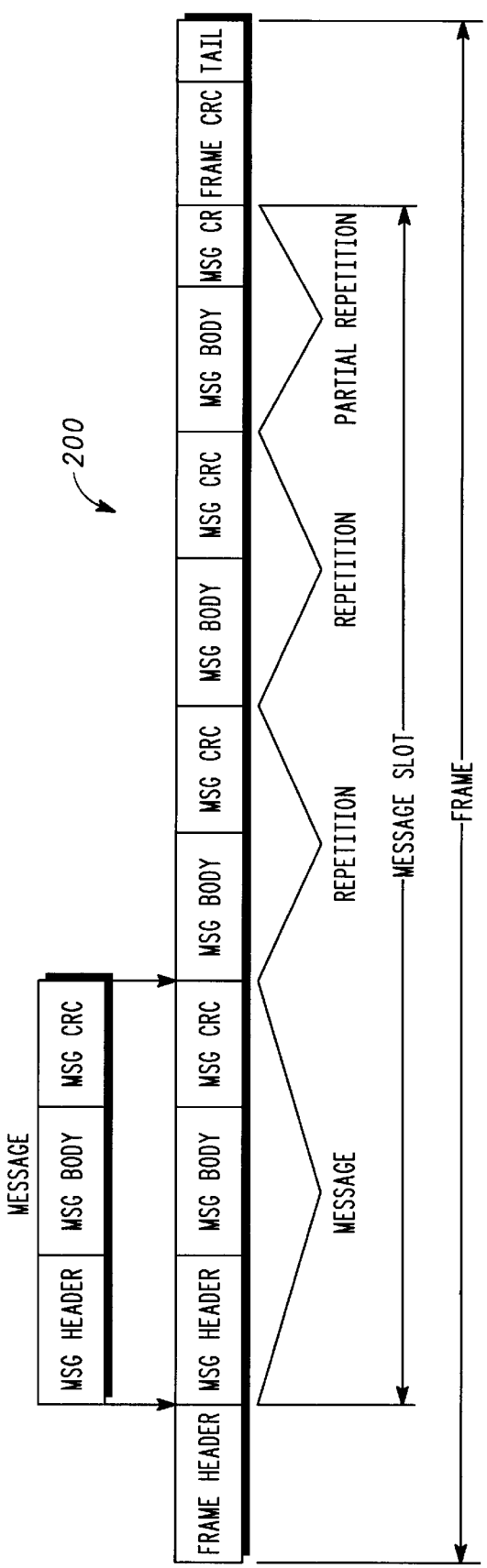
FIG. 2

METHOD AND APPARATUS FOR FORMATTING A MESSAGE IN A WIRELESS COMMUNICATION SYSTEM

FIELD OF THE INVENTION

The present invention pertains to communication methods and devices, and more particularly to an improved method and device for formatting a message.

BACKGROUND OF THE INVENTION

The signaling frame (such as the DCCH frame in IS2000 systems) used to transmit a signaling message over a cellular system, such as a code division multiple access (CDMA) system or a time division multiple access (TDMA) system, typically includes a frame header, a message slot, a code redundancy check (CRC) etc. It is known for the message slot to have a predetermined length, and it is further known for the frame to have a predetermined length. For example, IS-95 and IS-2000, which are the current 2G and 3G CDMA standards in the United States, have a predetermined message slot length. On the other hand, signaling messages may have varying lengths and under the standard, the leftover space is not used. Clearly, for short messages the waste of resources can be significant. Table 1 lists different message sizes for IS2000 systems.

TABLE 1

Message lengths.

| Message name | Message body length | MuxPDU Type 1 leftover bits | MuxPDU Type 2 Leftover bits |
| --- | --- | --- | --- |
| Base Station Challenge Order | 80 | 57 | 161 |
| SSD Update Confirmation Order | 48 | 89 | 193 |
| SSD Update Rejection Order | 48 | 89 | 193 |
| Parameter Update Confirmation Order | 48 | 89 | 193 |
| Mobile station Ack Order | 48 | 89 | 193 |
| Service Option Request Order | 64 | 73 | 177 |
| Service Option response | 58 | 73 | 177 |
| Release Order (Normal) | 48 | 89 | 193 |
| Release Order (w/Power Down) | 48 | 89 | 193 |
| Long code transition response order (use public) | 48 | 89 | 193 |
| Connect order | 48 | 89 | 193 |
| Continuous DTMF tone Order | 48 | 89 | 193 |
| Continuous DTMF tone order (stop) | 48 | 89 | 193 |
| Service option control order | 48 | 89 | 193 |
| Mobile station reject order | 56 | 81 | 185 |
| Authentication Challenge response message | 40 | 97 | 201 |
| Pilot Strength Measurement message | 104 | 33 | 137 |
| Power measurement report message | 64 | 73 | 177 |
| Send Burst DTMF message | 72 | 65 | 169 |
| Handoff completion message | 48 | 89 | 193 |
| Service connect completion message | 24 | 113 | 217 |
| TMSI assignment message | 16 | 121 | 225 |
| Candidate frequency search response message | 56 | 81 | 185 |
| Outer loop report message | 40 | 97 | 201 |
| Resource request message | 24 | 113 | 217 |
| Extended release response message | 16 | 121 | 225 |
| Mobile station resource release request message | 32 | 105 | 209 |

Table 1 assumptions: P_REV_IN_USE>=7, Encryption off, 3 Pilots visible to MS, DTMF burst of 10 digits.

As can be seen from the table, the messages have varying lengths, and the shorter messages do not use the full frame length. Accordingly, available bandwidth is wasted when shorter messages are transmitted.

The standard technique for recovering a message at the receiver is to check the frame CRC first after decoding the frame. If the frame CRC fails, the message is discarded, or erased. If the frame CRC is good, the message CRC is checked. If the message CRC fails, the message is discarded. Otherwise, the message is retained. Erased signal frames can translate into dropped calls, radio frequency (RF) power overruns, and user dissatisfaction. For example, when checking voice mail, keyed-in digits are sent over a signaling frame and the frame is erased. The phone display shows that the correct number was entered, but the user has to reenter them when the correct numbers are not received at the central server. Users can find such performance aggravating.

Accordingly, there is a need for an improved messaging format to enable more reliable communication.

BRIEF DESCRIPTION OF THE DRAWINGS

FIG. 1 illustrates a frame format according to the prior art.

FIG. 2 illustrates an improved frame format.

FIG. 5 FIG. 4 is a flow chart illustrating operation of a format circuit and decoder in the system according to FIG. 3.

DETAILED DESCRIPTION OF THE DRAWINGS

A wireless communication system includes a transmitting device having a formatting circuit. The formatting circuit constructs a frame, the frame including a frame header, a message slot, and a frame CRC, all with a predetermined length. The message slot of the frame is used to hold the signaling message. The signaling message includes a message header having the message length, a message body and a message CRC. The message body and message CRC are repeated to fill the message slot, and a partial message body and message CRC is copied into the message slot if the slot is not full and a full message body will not fit. A receiving device includes a format circuit coupled to the decoder for outputting a message from the decoded frame, the format circuit to check the frame CRC to determine if the frame CRC is good, to check the message CRC to determine if the message body CRC is good, and to reconstruct the message from the any full and partial message copies if the message CRC is not good. As used herein, a repetition is a copy of the message body and the message CRC, although it is envisioned that the message body alone could be copied.

FIG. 1 shows the frame format 100 of the signaling message and the physical frame (such as the DCCH frame in IS-2000) used to transmit the message. In the current IS-2000 standard, the leftover space is not used. Clearly, for short messages the waste of resources can be significant.

FIG. 2 shows a frame format 200 taking advantage of the unused message slot space for improving message throughput. In particular, the message body and message CRC are repeated until the message slot is stuffed. When there is no room for complete repetition of the message body, partial repetition is performed. In this way, all of the available space is used to maximize the amount of repetition. The more times that the message bits are repeated; the more likely the message will be accurately recovered at the receiver. Those skilled in the art will recognize from Table 1 that many signaling messages are short enough to take advantage of repetition to improve the chances of successful transmission, and thus improve overall performance of the wireless communication system.

Figure 3:
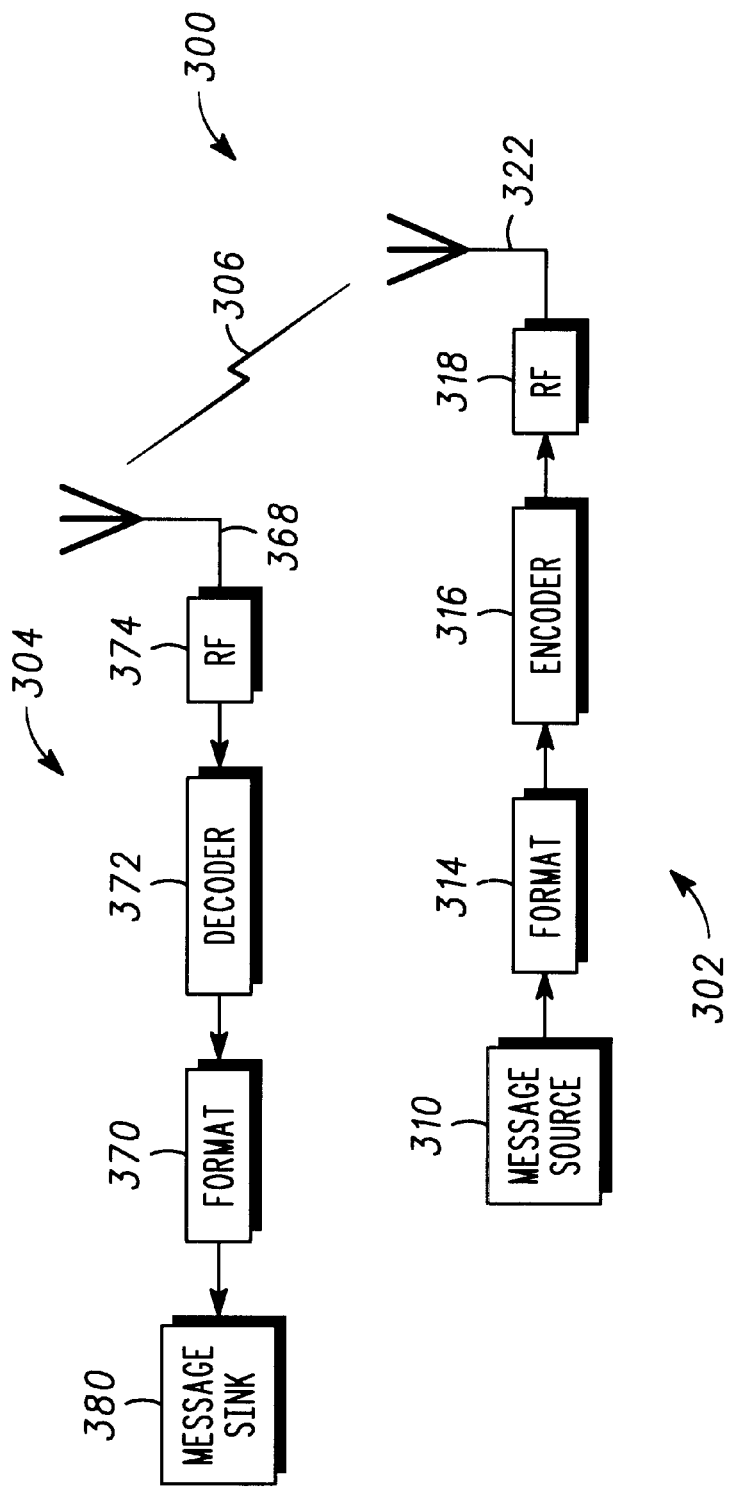
FIG. 3 is a circuit schematic in block diagram form illustrating a communication system.

A wireless system 300 is illustrated in FIG. 3. For simplicity, only one transmission direction link is shown, which may represent either the transmission link from mobile station to base station or the link from base to mobile. Those skilled in the art will recognize that the method disclosed herein can be employed for transmissions in both directions of a bi-directional communication system or they can be employed in a unidirectional system. The illustrated wireless system includes a transmitter 302 and a receiver 304. The transmitter and receiver communicate via a communication channel 306, which is air. The transmitter and receiver may be any suitable technology such as CDMA, TDMA, or the like, and may operate according to any standard.

The transmitter 302 transmit path includes a message source 310 that generates signaling messages. The message source may be for example the upper layer of an IS2000 system. The formatting circuit 314 formats or packs a message into a frame 200 (FIG. 2). The formatted frame is encoded in encoder 316 (FIG. 3). The encoder may be any suitable encoder, for example, a convolutional encoder or a turbo encoder and is typically specified by the standard (e.g., IS-95/IS-2000 CDMA standards, the GSM standard, or the like). The encoded signal output by encoder 316 is conditioned for transmission by a conventional RF front end 318, which may for example include modulators and amplifiers. The transmitted signal is emitted via antenna 322.

The receiver 304 receive path includes antenna 368, the RF front end 374, the decoder 372, the format circuit 370, and the message sink 380. The decoder decodes the encoded frame that can be a Viterbi convolutional decoder or a turbo decoder, depending on which coder is used at the transmitter. The format circuit extracts or unpacks the message from the decoded frame and forwards the message to its destination, the message sink. The message sink may for example be the upper layer in an IS2000 system.

The formatting circuit 314 and encoder 316, and the format circuit 370 and decoder 372, can each be implemented in a digital signal processor, a microcontroller, a microprocessor, a programmable logic unit, a combination of two or more thereof, or the like. Those skilled in the art will recognize that in a bi-directional communication system, a formatting circuit, encoder, format circuit and decoder can all be implemented in the same integrated circuit.

Figure 4:
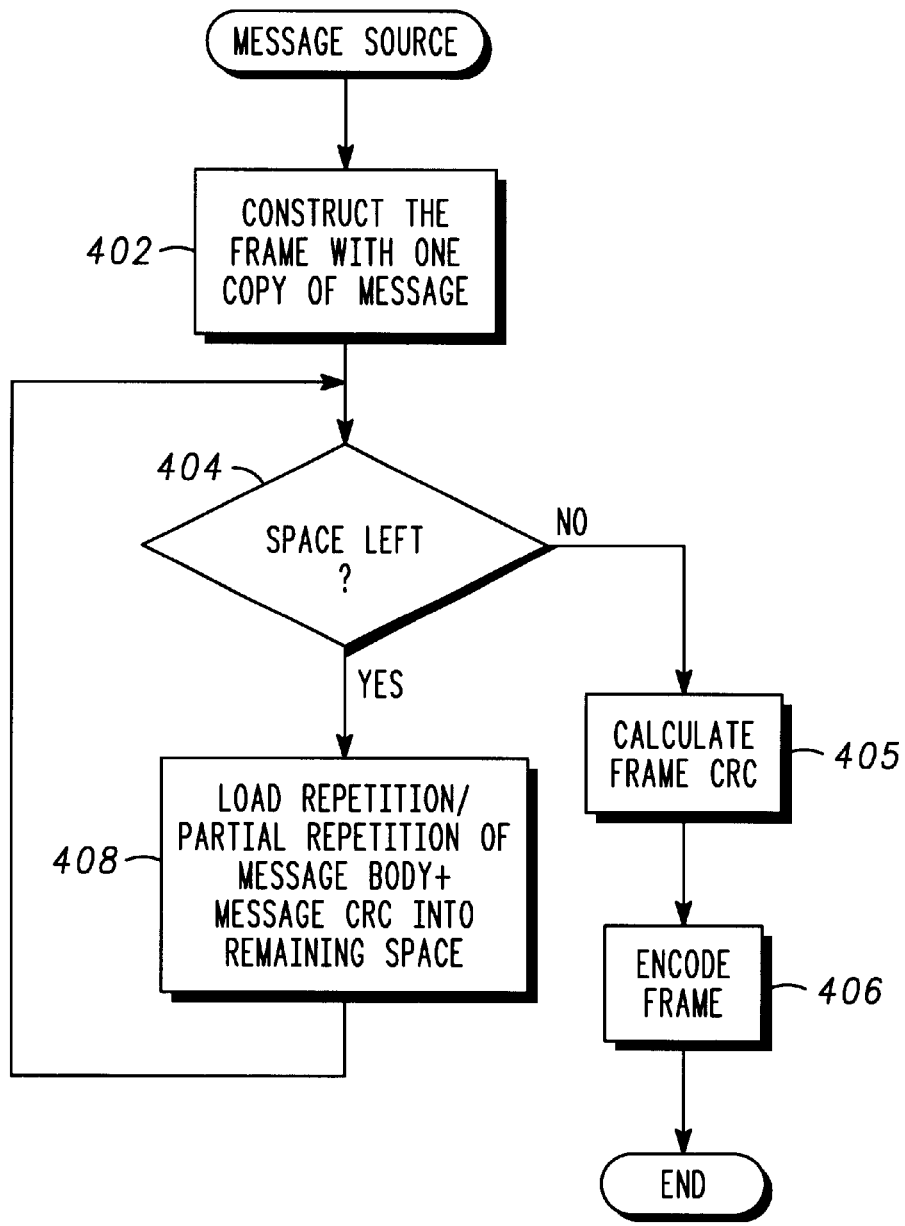
FIG. 4 is a flow chart illustrating operation of a formatting circuit and encoder in the system according to FIG. 3.

The operation of the formatting circuit 314 and the encoder 316 will now be described. The frame 200 (FIG. 2) is constructed as illustrated in FIG. 4. Initially, one copy of the message (message header, message body and message CRC) is written into the message slot of the frame. The formatting circuit 314 determines whether the message slot is full in step 404. If the message slot is full, the frame CRC is then calculated in step 405 and the frame is encoded for transmission in encoder 316 as indicated in step 406. If the message slot is not filled, a copy of the message body and the message CRC are added to the message slot immediately adjacent to the first copy of the message as indicated in step 408. The process then returns to step 404. Step 408 is repeated until the message slot is filled. In this manner, the message body plus the message CRC is repeated as many times as possible. If there is no room for a complete repetition, partial repetition is performed to stuff all of the available space in the message slot.

Figure 5:
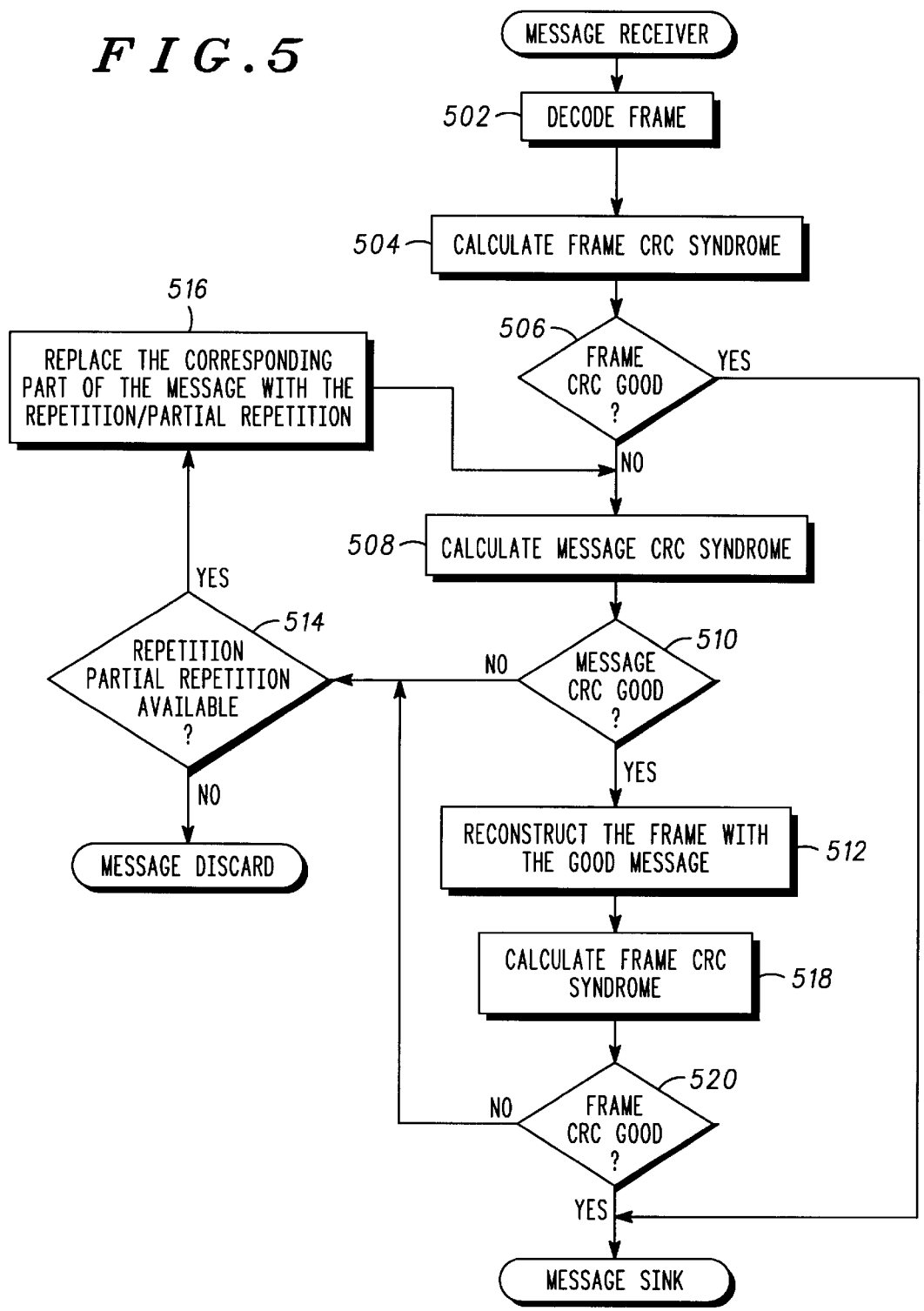

The operation of the receiver will now be described with reference to FIG. 5. The received frame 200 is decoded in the decoder 372 as indicated in step 502. The frame CRC syndrome is calculated in step 504. The frame CRC syndrome is checked in step 506. If the frame CRC is good, the message is extracted. If the frame CRC fails, the message CRC syndrome is calculated in step 508 and checked in step 510. If the message CRC fails in step 510, the format circuit 370 determines in step 514 if a repetition or a partial repetition of the message is available. If not, the message is discarded. If available, the repetition, or the partial repetition if a full repetition is not available, is used as a substitute to the corresponding part of the original message in step 516 and the process returns to step 508. The message CRC syndrome is re-calculated in step 508 and checked in step 510. This process continues until either one of the reconstructed messages succeeds the CRC check or all the repetitions (including the partial repetition) have been used to reconstruct the message.

It is envisioned that the message body, message CRC, and the full and partial copies of message body and message CRC can be mixed and matched in step 516 until a combination is found that passes step 510 or all combinations fail as determined in step 514. For example, the message body and the message CRC of the original message can be iteratively replaced by each full repetition version in step 516. This process continues until a full repetition version passes the CRC check (steps 508 and 510) or the last of the full repetitions has been considered. If none of the full repetition reconstructed messages passes CRC, the partial repetition is iteratively substituted in step 516 for the corresponding part of the original message and each of the full repetition copies. The step 508 of checking the message CRC is thus repeated for each such substitution until the original message and each copy have been considered with the partial message substituted, or the reconstructed message passes the CRC step 510. Alternatively, it is envisioned that a predetermined maximum number of combinations (reconstructions) can be set as the limit of the number of attempts that will be permitted.

Referring again to step 510. If a reconstructed signaling message produces a successful message CRC check, it is used to reconstruct the transmitted frame in step 512. The frame CRC check is then performed based on the reconstructed frame in steps 518 and 520. If the frame CRC check is successful with the reconstructed signaling message, the message is retained, otherwise return to step 514 to see if the next repetition is available and the process is repeated if available, otherwise the recovering attempt is failed and the message is discarded. This procedure is designed to use the frame CRC to detect the error in the reconstructed message in case the message CRC fails to detect it.

Figure 6:
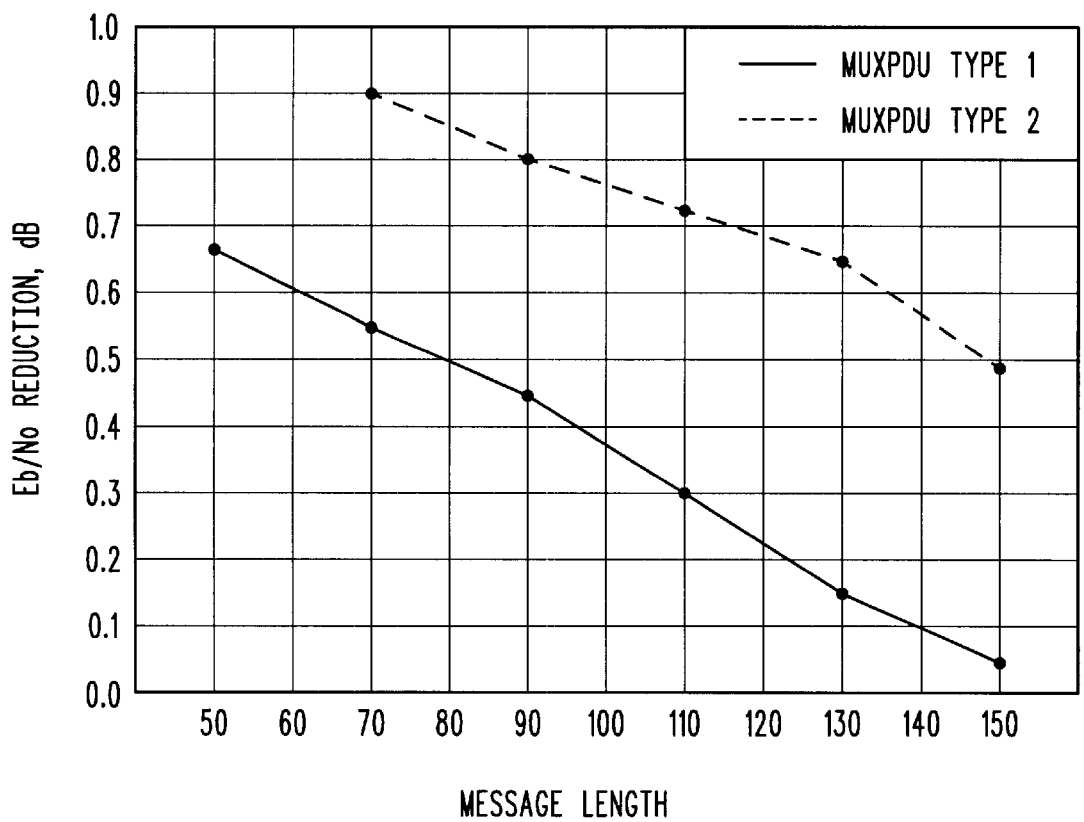
FIG. 6 is a chart illustrating the reduction of, or the savings in, the signal energy to noise ratio required at the receiver on the vertical axis and the message length in the horizontal axis for the MuxPDU Type 1 and MuxPDU Type 2.

FIG. 6 shows the $E_b/N_0$ reduction of the proposed scheme over the standard method for different message lengths for MuxPDU Type 1 and MuxPDU Type 2 in an IS2000 system.

It is envisioned that the transmitting device can inform the receiving device if repetitions are available in the message slot. For example, an indicator or flag may be transmitted. A disadvantage of this method is it increases the overhead. However, an advantage is that the receiving device can reduce processing instructions if it is aware that no repetitions are available.

Thus it can be seen that improved performance is achieved without detrimentally impacting on the bandwidth. Rather, the bandwidth available is fully utilized in a manner that improves performance. While specific components and functions of the system are described above, fewer or additional functions could be employed by one skilled in the art within the true spirit and scope of the present invention. The invention should be limited only by the appended claims.

We claim:

1. A wireless communication device, comprising:
   a formatting circuit, the formatting circuit for constructing a frame, the frame including a header, a CRC and a message slot, the message slot having a predetermined length to hold a message, and the message including a message header, a message body and a message CRC, the message body and message CRC being repeated to fill the message slot; and
   an encoder coupled to the formatting circuit, the encoder encoding the frame for transmission.

2. The wireless communication device of claim 1, wherein the message includes a message header, the message header including the message length.

3. The wireless communication device of claim 2, wherein the message header is not repeated in the message slot.

4. The wireless communication device of claim 2, wherein a partial copy of the message body and the message CRC is copied into the message slot if the slot is not full and a full copy of the message body and CRC will not fit into the message slot.

5. A wireless communication device, comprising:
   a decoder for decoding a message frame received from a communication link; and
   a format circuit coupled to the decoder for outputting a message from the decoded frame, the format circuit to check a frame CRC to determine if the frame CRC for the decoded frame is good, to check the message to determine if a message CRC is good, and to check the reconstructed message using the repeated message copy to determine if the reconstructed message is good.

6. The wireless communication device of claim 5, wherein the format circuit reconstructs the message from the repeated message bodies and the message CRCs if the message CRC is not good.

7. The wireless communication device of claim 6, wherein the format circuit uses partial copies to reconstruct the message if the message CRC is not good.

8. A wireless communication system comprising:
   a transmitting device including
      a formatting circuit, the formatting circuit for constructing a frame, the frame including a frame header, a frame CRC and a message slot, the message slot having a predetermined length, the message slot to carry a signaling message, the message including a message header having the message length, a message body and a message CRC, the message body and message CRC being repeated to fill the message slot, a partial copy of the message body and message CRC being copied into the message slot if the slot is not full and a full copy will not fit,
      an encoder coupled to the formatting circuit, the encoder encoding the frame for transmission, and
      circuitry coupled to the encodes for transmitting the encoded frame over a communication link; and
   a receiving device, comprising:
      receive circuitry for receiving the frame transmitted over the communication link,
      a decoder coupled to the receive circuitry to decode the message frame received from the communication link; and
      a format circuit coupled to the decoder to output a message from the decoded frame, the format circuit to check the frame CRC to determine if the frame CRC is good, if the frame CRC is not good to check the message to determine if the message CRC is good, and if the message CRC is not good, to reconstruct the message from repeated full and partial copies of the message body and message CRC.

9. A method of constructing a frame for transmission over a communication link comprising the steps of:
   constructing a frame having a predetermined message slot length, the frame including one copy of a message with message header, message body, and message CRC;
   loading a copy of the message body with message CRC if there is room left in the message slot; and
   loading a partial copy of the message body and message CRC into the frame if a full copy will not fit and there is room left in the message slot; and
   calculating frame CRC and loading the calculated CRC.

10. A method of deconstructing a frame received from a communication link, the method comprising the steps of:
    checking a message CRC for a message in the frame; and
    checking a reconstructed message CRC if the message CRC is not good, wherein the reconstructed message is reconstructed using at least a partial copy of the message that is included in the frame.

11. The method of claim 10, further including the steps of:
    determining if a frame CRC is good, and
    extracting the message from the frame if the frame CRC is good, and if the frame CRC is not good, then performing a step of calculating the message CRC.

12. The method of claim 11, further including the step of reconstructing the frame if the message CRC was good and the frame CRC was not good.

13. The method of claim 10, wherein a reconstruction of the reconstructed message comprises replacing the portion of the message corresponding to the at least a partial copy with the at least a partial copy.

14. The method of claim 10, further including the step of reconstructing the message using at least a partial copy of the message.

15. A method of transmitting a message over a wireless communication link comprising the steps of:

constructing a frame having a predetermined message slot length, the frame including one copy of a message with a message header, a message body, and a message CRC;

loading a copy of the message body and message CRC if there is room left in the message slot; and loading a partial copy of the message body and message CRC in the frame if there is room left in the message slot but not enough room for a full message copy and message CRC;

calculating the frame CRC and loading the calculated frame CRC;

encoding the frame;

transmitting the frame;

receiving the frame;

calculating the frame CRC syndrome;

calculating the message CRC syndrome for the message in the frame if the frame CRC is not good; and calculating a reconstructed message copy CRC syndrome if the message CRC is not good.

16. The method of claim 15, further including the steps of:

determining if a frame CRC is good, and extracting the message from the frame if the frame CRC is good, and if the frame CRC is not good, then performing the step of calculating the message CRC.

17. The method of claim 16, further including the step of reconstructing the frame using the message if the message CRC was good.

18. The method of claim 17, further including the step of reconstructing the message using any full and partial message copies if the message CRC was not good.

* * * * *

UNITED STATES PATENT AND TRADEMARK OFFICE
CERTIFICATE OF CORRECTION

PATENT NO.     : 6,622,278 B1
DATED          : September 16, 2003
INVENTOR(S)    : Morgan et al.

It is certified that error appears in the above-identified patent and that said Letters Patent is hereby corrected as shown below:

Column 6,
Line 29, reads "encodes", should read -- encoder --.

Signed and Sealed this

Twenty-fourth Day of February, 2004

JON W. DUDAS
*Acting Director of the United States Patent and Trademark Office*